Dec. 30, 1947.  A. SEARLES ET AL  2,433,789
CUSHIONING ROLLER FOR CONVEYOR BELTS
Filed Dec. 2, 1944  5 Sheets-Sheet 1
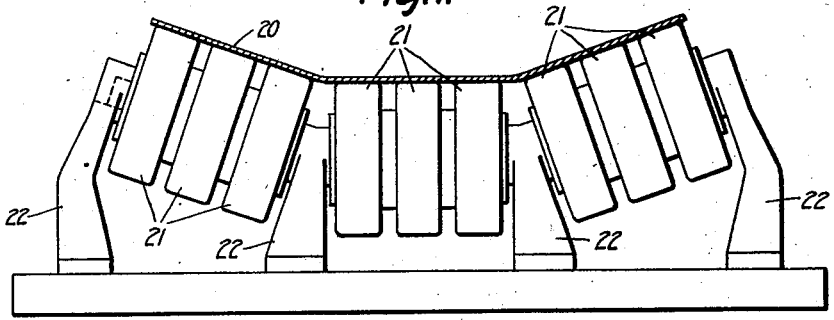
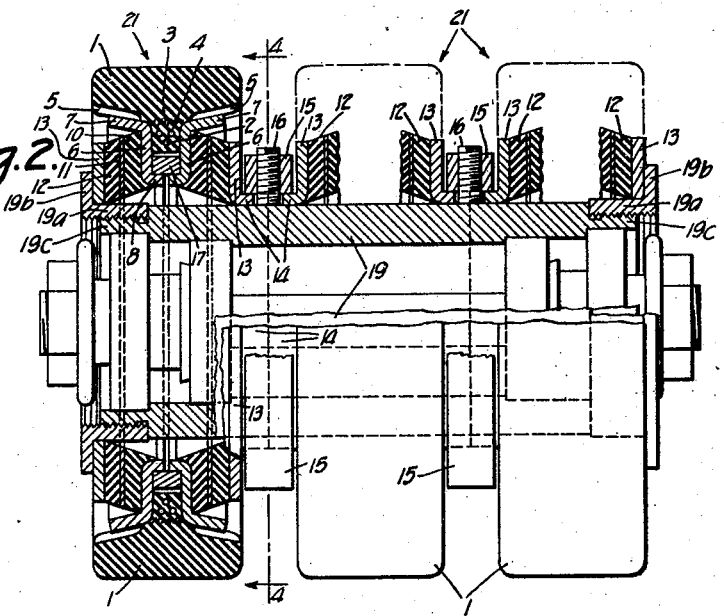
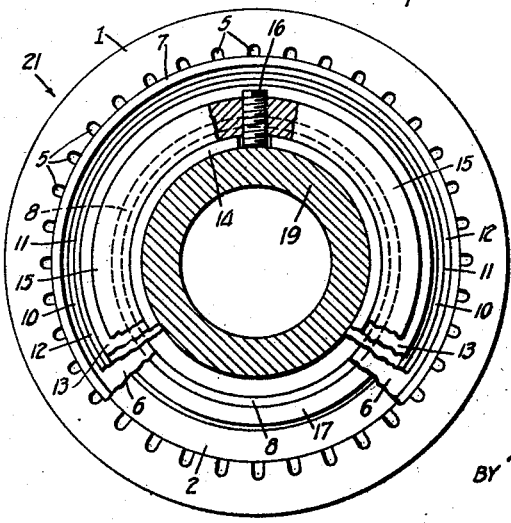
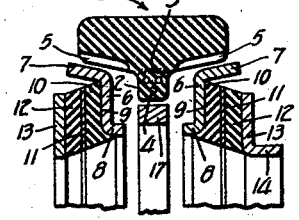
INVENTORS
Amos Searles and
Charles A. Swartz
BY *Moser, Nolte, Grumet Berry*
ATTORNEYS

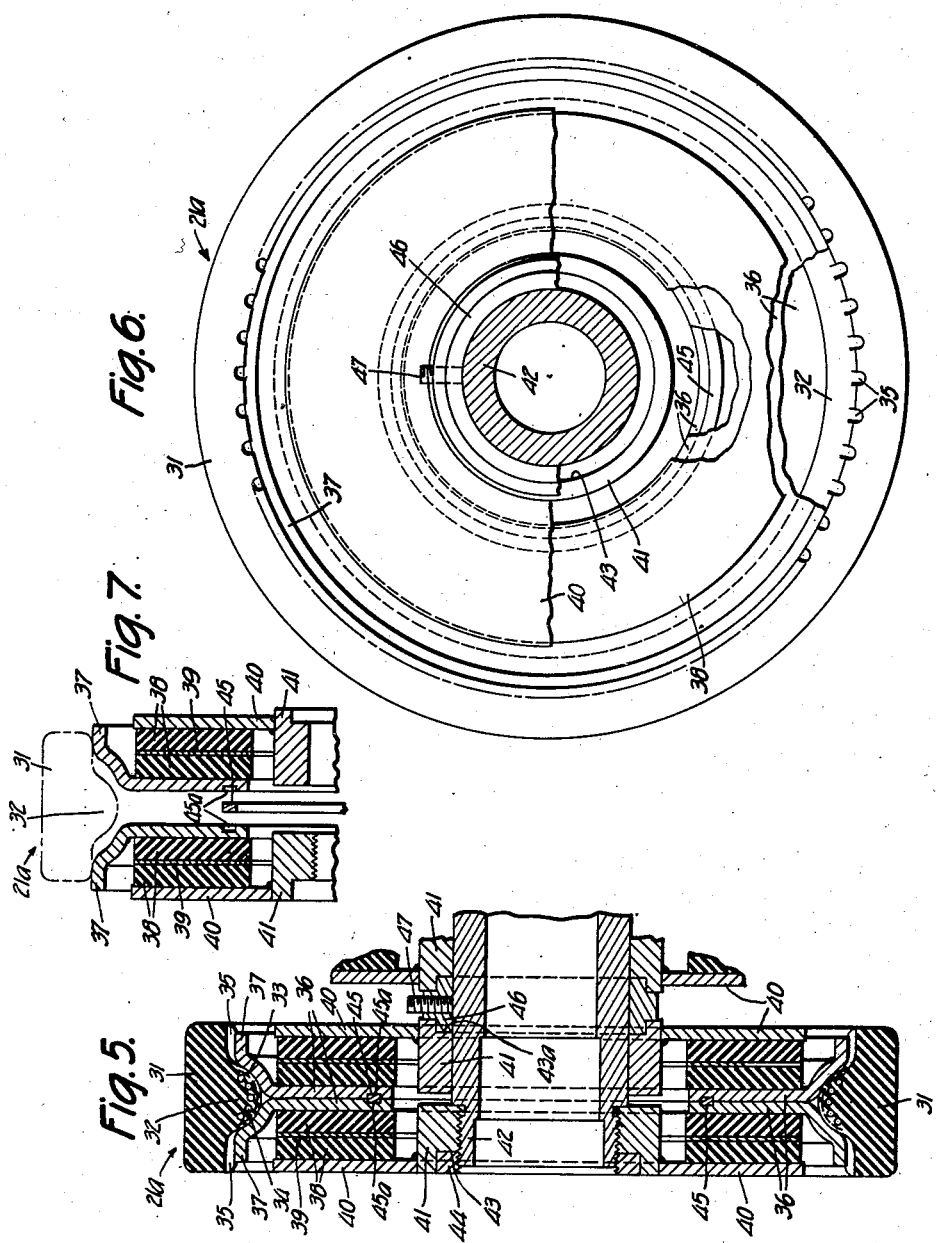

Dec. 30, 1947.　　A. SEARLES ET AL　　2,433,789
CUSHIONING ROLLER FOR CONVEYOR BELTS
Filed Dec. 2, 1944　　5 Sheets-Sheet 3
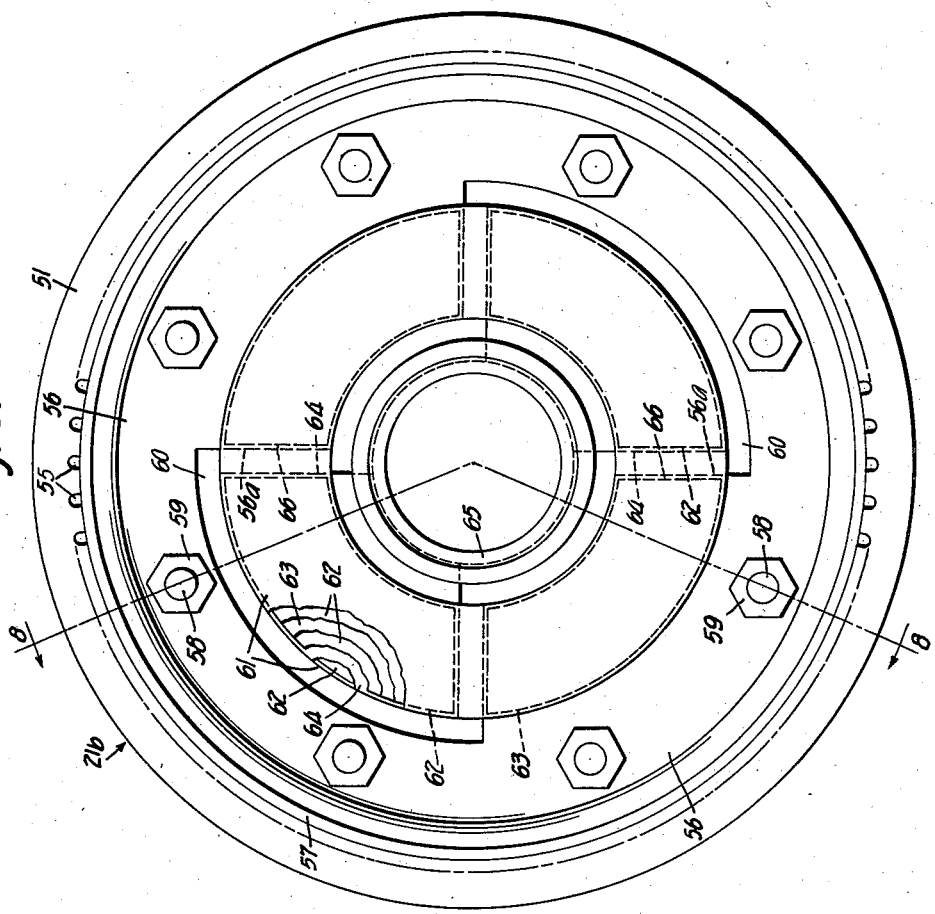
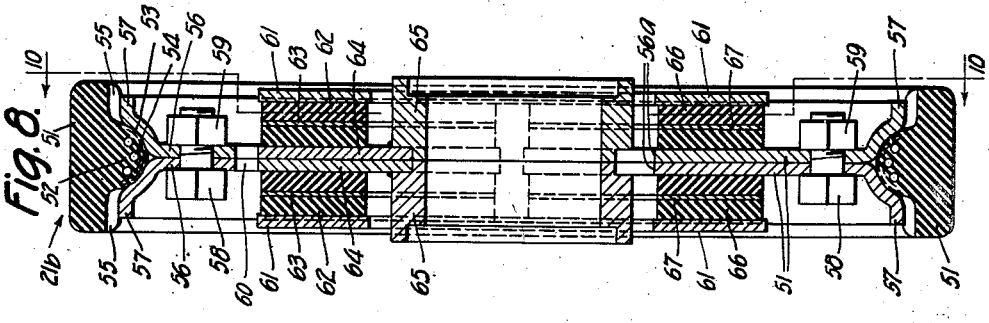
INVENTORS
Amos Searles and
Charles A. Swartz
BY Moser, Nolte, Crews & Berry
ATTORNEYS

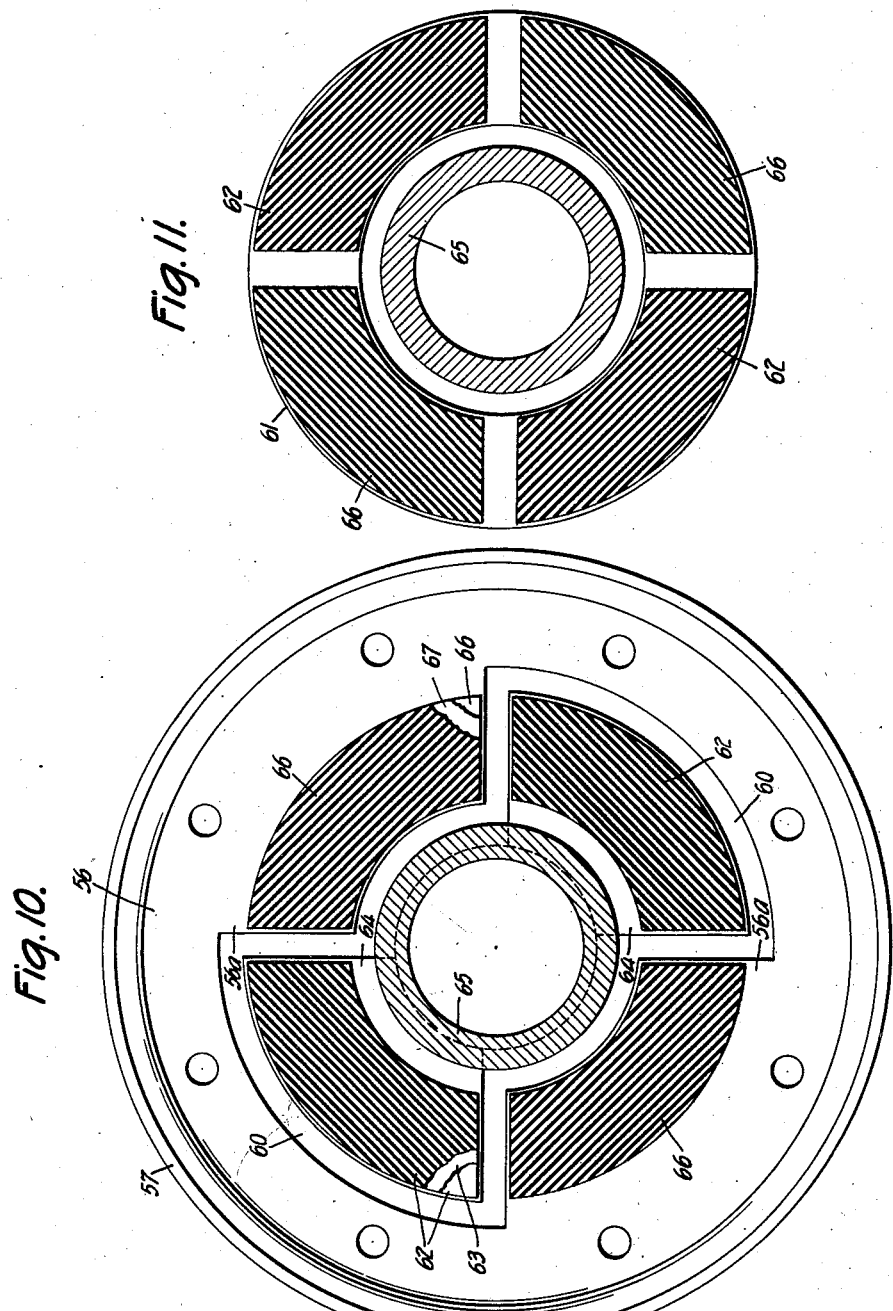

Dec. 30, 1947.  A. SEARLES ET AL  2,433,789
CUSHIONING ROLLER FOR CONVEYOR BELTS
Filed Dec. 2, 1944  5 Sheets-Sheet 5
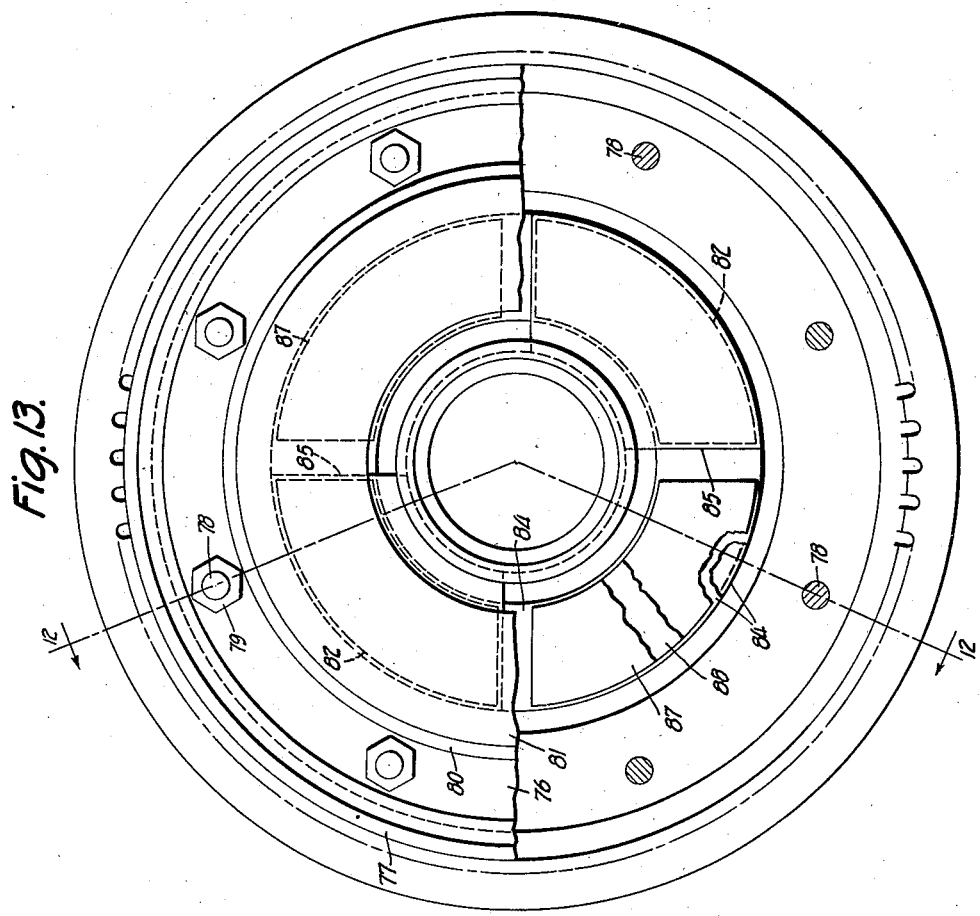
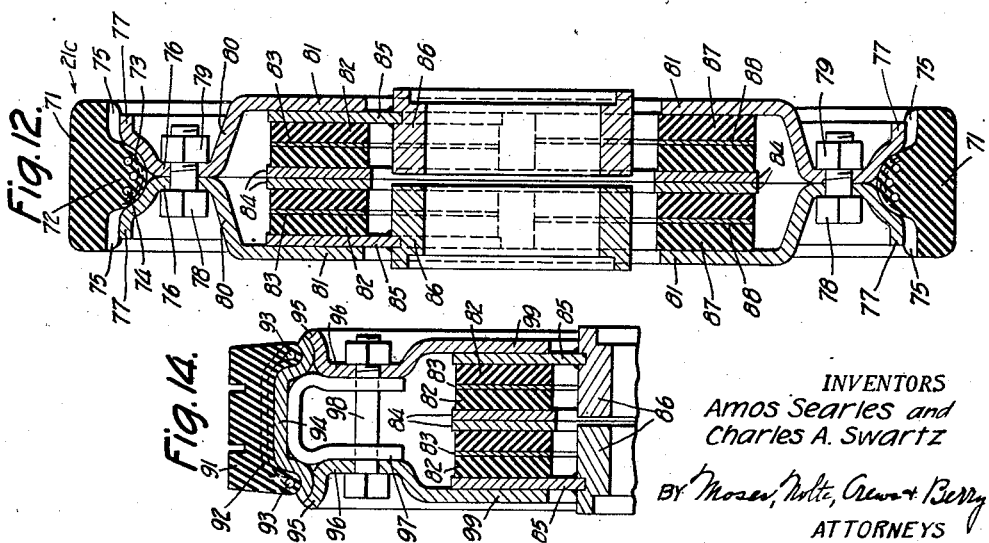
INVENTORS
Amos Searles and
Charles A. Swartz
ATTORNEYS Patented Dec. 30, 1947

2,433,789

UNITED STATES PATENT OFFICE 2,433,789

CUSHIONING ROLLER FOR CONVEYOR BELTS

Amos Searles, Moscow, Pa., and Charles A. Swartz, Yonkers, N. Y.

Application December 2, 1944, Serial No. 566,338

7 Claims. (Cl. 74—230.1)

This invention relates to belt conveyors, and more particularly to improvements in the construction of idler rollers used in such conveyors.

Belt conveyors of the type herein considered are employed to transport lumps or masses of ore, rock, coke or other material which are discharged on to the belts from chutes. The impact of discharge of these heavy masses subjects the conveyor belt and idler rollers to large damaging forces, which heretofore have greatly shortened the life of a conveyor.

It is, therefore, an object of this invention to provide in belt conveyor idler rollers means capable of absorbing large impact forces and prevent damage to the belt and rollers.

A further object is to provide in an idler roller a resilient surface conformable with the imposed load to distribute said load and reduce the pressure per unit area thus preventing damage to a conveyor belt from concentrated high unit loading due particularly to impact.

A further object is to improve conveyor belt idler rollers by providing elements arranged to absorb shocks by shearing action rather than by compression.

These and other objects are attained by the novel construction and arrangement of parts hereinafter described and illustrated in the accompanying drawings, forming a part hereof, and in which:

Fig. 1 is a transverse view of a conveyor belt and idler rollers showing the general arrangement of idler rollers in accordance with this invention.

Fig. 2 is a view, partly in section, of an idler roller assembly embodying the invention;

Fig. 3 is a sectional view taken on the line 4—4 of Fig. 2;

Fig. 4 is an exploded section view of a portion of an idler roller shown in Fig. 2;

Fig. 5 is a sectional view of modified form of the invention;

Fig. 6 is a sectional end view of the construction shown in Fig. 5, some of the parts being broken away to expose others;

Fig. 7 is an exploded sectional view of a portion of the idler roller shown in Fig. 5;

Fig. 8 is a sectional view of a further modification, taken on line 8—8 of Fig. 9 and rotated into a single plane for the purpose of clarity.

Fig. 9 is an elevational view as seen from the right in Fig. 8;

Fig. 10 is a sectional view taken on line 10—10 of Fig. 8, looking in the direction of the arrows;

Fig. 11 is a sectional view also taken on the line 10—10 of Fig. 8 but looking in a direction opposite to the arrow, and showing the arrangement of segmental members shown in Fig. 10;

Fig. 12 is a sectional view of a further modification, taken on line 12—12 of Fig. 13, and rotated into a single plane for the purpose of clarity;

Fig. 13 is an elevational view of the modification shown in Fig. 12 some of the parts being broken away to expose others; and Fig. 14 is a sectional view of a further modification.

Referring to the drawings, in Fig. 1 is shown a conveyor having a belt 20 supported by a plurality of idler rollers 21 arranged in groups to give the belt a substantially arcuate shape. The rollers 21 are rotatably mounted on supports 22.

Referring to Figs. 2 and 3 each idler roller 21 is shown to comprise a resilient tread tire 1 having an axial T cross-section with a central rib 2, which is reinforced by layers of duck 3 in addition to wires 4. The inner radial surfaces of the tire axially disposed on either side of the rib 2 are axially grooved at 5 to provide additional means for displacement of the resilient tire material during deflection and prevent destructive stretching and creeping relative to the central reinforced rib 2.

The function of the tire is to provide a resilient surface conformable with the imposed load, to distribute said load and thereby reduce the pressure per unit area on the belt and to prevent damage thereto from concentrated high unit loading due particularly to impact. The central rib 2 provides means for clamping and restraining the tire in proper position between supporting discs 6.

The supporting discs have outward axially-extending flanges 7 and inward axially-extending flanges or hub formation 8. To the outward surface 9 of each disc 6 is attached or bonded a rubber ring 10, which is also attached to intermediate circular metal plates 11. Attached to the other side of each plate 11 is another rubber ring 12 which in turn is attached to metal ring 13, some of the rings having flanges 14 by which the rollers 21 are supported on tube 19.

Resting upon the flanges 14 between adjacent rollers are rings 15, which are secured by set screws 16 which engage the supporting tubular shaft 19 and serve as means to prevent relative rotation of adjacent units.

At the ends of each idler roller group, the rings 13 are not provided with flanges and have the rubber rings 12 secured thereto. Each of these end rings 13 is supported on a cylindrical extension 19a of a flange 19b. The extension 19a screws onto a reduced end 19c and thus by rotating the flange 19b by a suitable tool it is forced against the end ring 13 to press the roller units tightly against each other. The extension 19a and the flanges 14 form means of axial support and axial restraint on the central rotatable element comprising the tubular shaft 19, bearings, dust seals, stationary supporting shaft or rotatable shaft restrained by stationary bearings as may be conventionally elected.

The load of the belt and its burden and the impact of material being dropped on the belt, or impact due to the disturbance of portions of the material being conveyed, will be transferred through these units comprising a complete idler roll to the supporting structure through the resilient rubber rings 10 and 12 in shear.

The axially extending flanges 7 provide radial support to that portion of the tire with which they make radial contact and assume a portion of any radial load imposed on the tire tread radially inward toward the common axis.

The inward axial flanges 8 are directed axially together and provide means for uniting the discs 6 radially to prevent relative radial movement under load, with clearance between the ends to enable clamping of the stem of the tire 1. Relative radial movement of discs 6 is prevented by ring 17 which surrounds flanges 8 jointly. The outer diameter of ring 17 may be such as to fit within the central rib 2 of tire 1 to assist in supporting the tire against any radial load imposed upon the tire tread radially inward toward the common axis.

The principal parts comprising each roller or unit 21 may be placed for ready assembly as in Fig. 4. After assembly, each unit 21 may be placed on the tube 19. Any number of these units (three being shown) may then be clamped together between the flanges 19b. They are then locked against relative rotation by the set screws 16.

The assembled units as described provide a conformable outer tread in combination with resilient cushioning by which the load is transmitted in shear through the annular rubber rings 10 and 12 or segments.

The modification shown in Figs. 5, 6 and 7 is basically the same as that shown in Fig. 2. Each roller 21a comprises a cushioning element comprising a resilient tire 31 having a T cross section with a rib 32, reinforced with layers of duck 33 and wire 34, and provided with axial grooves 35 for purposes hereinbefore explained. This reinforcement of the tire resists creeping of the tire on its supporting structure while affording effectual resiliency.

The rib 32 is constrained between supporting discs 36 having outwardly extending radial flanges 37 conforming with the inner axial surface of the tire. Attached to the outer surfaces of the discs 36 are rubber rings or segments 38 or other resilient material, each having an intermediate metal plate 39.

The outer radial surfaces of the shear elements 38 are attached to the adjacent surfaces of discs 40, which are rigidly attached to hubs 41. The end hubs 41 are threaded on to the supporting tubular shaft 42 to clamp the units together and have right angularly cut-out portions 43 adapted to receive locking rings 44, which are threaded on to the supporting tubular shaft 42. Between adjacent rollers 21a, a ring 46 is positioned in the recesses 43a of intermediate hubs 41 and the ring 46 is held in place by a set screw 47.

The two tire supporting flanged discs 36 are united to prevent relative radial movement under load by means of a ring 45 seated into registering concentric channels 45a in the adjacent surfaces of said discs.

The spacing rings 46 are arranged to fit within the annular recesses 43a in the outer ends of the intermediate hubs 41 and fitted to grip the radially outward axial surfaces of the recesses when the locking set screws 47 are tightened, due to radial clearance of the bore of the spacing ring and the supporting member.

In the modified form shown in Figs. 8, 9, 10 and 11, the arrangement incorporates shear elements in series by means of which increased deflection is accomplished within the limited axial space available. The cushioning unit 21b comprises a resilient tread tire 51 of T-shape cross section having a central rib 52 reinforced with layers of duck 53 and wires 54. The inner surfaces of the tire axially disposed on either side of the rib 52 are provided with a plurality of grooves 55 to provide additional means for displacement of the tire material as explained in connection with Fig. 2.

The central rib 52 of the T-shape cross section provides means for clamping and restraining the tire in proper position between supporting discs 56 by means of bolts 58 and nuts 59. The supporting plates 56 are provided with outwardly extending flanges 57 to engage the inner surfaces in which the grooves 55 are provided.

Referring to Figs. 9, 10 and 11 it will be seen that the discs 56 are provided with radial portions 56a which divide the disc into two equal radial segmental spaces 60 to provide space and clearance for relative movement under load of adjacent parts. The two segments 56a extend inwardly towards the axis of the roller and are attached at their outer surfaces to resilient segmental elements 66, which may be of rubber or a similar material, having an intermediate metal plate 67. The shearing elements 66 are attached at their outer surfaces to discs or rings 61, which encircle the split hub member 65 fitted over a supporting tubular shaft like the one marked 42 in Fig. 5.

Fixed to the supporting hubs 65 are segmental plates 64, positioned in the segmental spaces 60. The plates 64 abut each other and have fixed to their outer surfaces resilient elements 62, which may be of rubber or the like, and have an intermediate metal plate 63. The outer surfaces of elements 62 are attached to the inner surfaces of the discs 61.

With this structure, the deflection forces imparted, see Fig. 8, to the tire 51 are transmitted by discs 56 through the shearing elements 66 to discs 61, and thence through shearing elements 62 to segments 64 and finally the supporting hub 65.

The roller 21c of the modification shown in Figs. 12 and 13 is similar to that shown in Figs. 8 to 11 except that the tire supporting structure is different. In this form, a tire 71, of T-shape cross section, has a central rib 72 reinforced by layers of duck 73 and wires 74, and the inner surface of the tire has a plurality of grooves 75. The pair of tire supporting discs 76 have outwardly extending flanges 77 engaging the inner surface of the tire. The discs are held together by bolts 78 and nuts 79. The discs are flared outwardly at 80 and then extended downwardly to provide walls 81 which do not contact the supporting hubs 86.

The walls 81 are ring shaped and have attached to their inner surfaces segmental resilient elements 87, which have intermediate metal segments 88; and the inner surfaces of elements 87 are attached to metal plate rings 84 which encircle the supporting hubs 86.

The walls 81 slidingly engage plates 85 which are attached to the supporting hubs 86. The inner surfaces of plates 85 are attached to resilient elements 82 provided with intermediate metal plates 83; and the inner surfaces of elements 82 are attached to the outer surfaces of the plate rings 84. The shock absorbing action of this structure is similar to that of Fig. 8.

In the form shown in Fig. 14, the arrangement of a unit incorporating shear elements in series is like that shown in Fig. 13 but supports a resilient tire 91 in a different manner. The resilient tire 91 is cupped on its inner side to present a substantially U-shaped cross section with radially inwardly extending portions, and is reinforced by layers of duck 92 and wires 93. The tire is supported by a metal rim 94, which has a firm gripping contact with the flanges 95 of the plates 96, which are held together by bolts and nuts 98.

The rims 94 may be continuous rings or cut axially at any radial position. When the rim 94 is continuous, the tire 91 will be built on the rim with its fabric and wire reinforcement complete.

If the rim is split, the tire can be built complete, independently of the rim, and the rim sprung into place in intermedial concentric grooves of the tire. Clips 97, only one of which is shown, may be welded to the rim, or they may be free. The clips 97 serve to act as spacers for the side plates 96, and to create means of radial support and axial location relative to the side plates 96 in addition to the contact of the rim with the flanges 95.

The plates 96 are flared outwardly to provide side walls 99 slidably engaging plates 85 which are attached to the supporting hubs 86, as described in connection with Fig. 12. The inner walls of plates 85 have attached thereto shearing resilient elements 82, provided with intermediate metal plates 83. The elements 82 are in turn attached to the outer surfaces of plate rings 84, which encircle the supporting shaft 86, as described in connection with Fig. 12.

From the above description it will be seen that there has been provided a plurality of idler rollers for a belt conveyor shock absorbing means whereby the impacts upon the belt may act on one or more of the rollers simultaneously and in which the impact is received by the tire of each roller acted upon and transmitted to the supporting shaft by resilient shearing actions, the major portions of the forces being practically absorbed before reaching the supporting hubs.

We have described what we believe to be the best embodiments of our invention. We do not wish, however, to be confined to the embodiments shown, but what we desire to cover by Letters Patent is set forth in the appended claims.

We claim:

1. In an idler roller for belt conveyors, a sillient tire having a radially inwardly extending portion, a pair of discs for supporting the tire cooperating with the inwardly extending portion thereof, a supporting shaft, a pair of plates spaced from the discs supported on the shaft, and resilient material attached to and connecting the discs and plates together, said discs having inward axially extending portions, and a separable ring surrounding said inward axially extending portions and cooperating therewith to prevent radial displacement of the discs relative to each other.

2. In an idler roller for belt conveyors, a tire of resilient material, discs for supporting the tire, a supporting shaft, a pair of plates spaced from the discs and supported on the shaft, resilient material attached to and connecting the discs and plates, means cooperating with the discs for preventing relative radial movement of the discs under load, at least one of said plates having an outward axially extending portion and means cooperating with said outward portion for fixing the plate to the shaft against rotational displacement relative thereto.

3. In an idler roller for belt conveyors, a resilient tire having a plurality of axial grooves on its underside, said tire being of T-shape cross section with a central rib, means for reinforcing the tire, a pair of discs engaging the rib for supporting the tire, a supporting shaft, and resilient means interposed between the discs and the shaft.

4. In a roller for belt conveyors, a tire made of non-metallic resilient material and having a plurality of axially extending grooves on its inner side, a pair of discs having outwardly extending flanges engaging the underside of the tire, means for clamping the discs together, a supporting shaft, a pair of plates rigid with the supporting shaft, and non-metallic resilient means connecting the discs and the plates.

5. In a roller for belt conveyors, a resilient tire having a radially inwardly extending portion, a pair of discs clamping the radially inwardly extending portion and having flanges engaging the under side of the tire, a supporting shaft, a pair of plates spaced from the discs and supported on the shaft, non-metallic resilient material connecting the plates and discs, at least one of said plates having means adapted to receive a ring surrounding the shaft, and ring means cooperating with said plate ring receiving means and adapted when secured to the shaft to prevent rotation of the plate.

6. In a roller for belt conveyors, a resilient tire having a central rib, a pair of discs clamping the rib and having flanges engaging the under side of the tire, means to hold the discs against relative movement, a supporting shaft, plate means spaced from the discs and supported on the shaft and resilient elements connecting the plates and discs, hub means formed on the plate means and having a recess adapted to receive a ring surrounding the shaft, and ring means fitted in the recess which when tightened to the shaft serve to prevent rotation of the plate.

7. In combination, a supporting shaft, a plurality of roller units removably connected to the shaft, each of said units comprising a resilient tire, a pair of opposed discs for supporting the tire, a pair of plates respectively spaced from and outwardly of the discs, resilient means connecting the plates to the respective discs, at least one of the plates having an outward axially extending portion formed thereon and adapted to surround the shaft, the outward portion of adjacent units adapted to engage one another thereby to maintain the units in spaced relationship on the shaft, and ring means secured to the shaft and surrounding the adjacent abutting outward portion of the respective units and frictionally engaging the same to prevent the rotation of the unit upon the shaft.

AMOS SEARLES.
CHARLES A. SWARTZ.

REFERENCES CITED

The following references are of record in the file of this patent:

UNITED STATES PATENTS

| Number | Name | Date |
|---|---|---|
| 2,074,341 | Piron | Mar. 23, 1937 |
| 2,124,350 | Hirshfeld | July 19, 1938 |
| 2,046,216 | Steward | June 30, 1936 |
| 2,291,959 | Goodrich | Aug. 4, 1942 |